United States Patent
Fujita et al.

(10) Patent No.: US 11,124,658 B2
(45) Date of Patent: Sep. 21, 2021

(54) INFRARED REFLECTIVE COATING COMPOSITION

(71) Applicant: NIPPON PAINT HOLDINGS CO., LTD., Osaka (JP)

(72) Inventors: Takeshi Fujita, Osaka (JP); Isamu Onishi, Osaka (JP); Yoichi Adachi, Osaka (JP); Go Suzuki, Osaka (JP); Kazuyuki Kamaya, Osaka (JP)

(73) Assignee: NIPPON PAINT HOLDINGS CO., LTD, Osaka (JP)

( * ) Notice: Subject to any disclaimer, the term of this patent is extended or adjusted under 35 U.S.C. 154(b) by 0 days.

(21) Appl. No.: 16/069,679

(22) PCT Filed: Jan. 12, 2017

(86) PCT No.: PCT/JP2017/000850
§ 371 (c)(1),
(2) Date: Jul. 12, 2018

(87) PCT Pub. No.: WO2017/122733
PCT Pub. Date: Jul. 20, 2017

(65) Prior Publication Data
US 2019/0031889 A1 Jan. 31, 2019

(30) Foreign Application Priority Data

Jan. 13, 2016 (JP) .............................. JP2016-004714

(51) Int. Cl.
*C09D 5/00* (2006.01)
*C09D 7/61* (2018.01)
(Continued)

(52) U.S. Cl.
CPC ................ *C09D 5/004* (2013.01); *B32B 7/02* (2013.01); *B32B 9/00* (2013.01); *C09C 1/006* (2013.01);
(Continued)

(58) Field of Classification Search
CPC . C09D 5/004; C09D 7/61; C09D 7/68; C09D 7/70; C09D 7/40; C09D 201/00;
(Continued)

(56) References Cited

U.S. PATENT DOCUMENTS 4,799,745 A * 1/1989 Meyer ............... B32B 17/10174
359/360
4,916,014 A * 4/1990 Weber .................... C09D 5/004
428/403
(Continued)

FOREIGN PATENT DOCUMENTS

CN 101688067 A 3/2010
DE 102005029647 A1 2/2007
(Continued)

OTHER PUBLICATIONS

Search Report of corresponding EP Application No. 17738487.2, dated Jun. 24, 2019, 7 pages.
(Continued)

*Primary Examiner* — Ling Siu Choi
*Assistant Examiner* — Ronald Grinsted
(74) *Attorney, Agent, or Firm* — Muncy, Geissler, Olds & Lowe, P.C.

(57) ABSTRACT

Provided is an infrared-reflective coating composition that includes: a scale-like infrared-reflective pigment; and a resin component, wherein the pigment includes a layered body that has dielectric layers and a metal thin film layer layered in an alternate fashion with the dielectric layer on the outermost layer; the dielectric layer is formed from one or more materials such as titanium dioxide; the metal thin film layer is formed from a silver compound; a film thickness of the metal thin film layer is 5 to 15 nm; a film thickness of the dielectric layer is $((N\lambda)/(4r))\pm20$ nm (N=1, 2 or 3) wherein wavelength $\lambda$ of incident light is 250 to 980 nm, and
(Continued)

r is a refractive index of the dielectric layer; and a proportion of the infrared-reflective pigment having a particle diameter of 1 μm or smaller is 10% by volume or smaller.

1 Claim, 2 Drawing Sheets

(51) Int. Cl.
| | |
|---|---|
| *C09D 7/40* | (2018.01) |
| *B32B 7/02* | (2019.01) |
| *B32B 9/00* | (2006.01) |
| *C09C 1/00* | (2006.01) |
| *C09C 1/62* | (2006.01) |
| *C09D 201/00* | (2006.01) |
| *C09D 5/33* | (2006.01) |
| *C08K 9/02* | (2006.01) |

(52) U.S. Cl.
CPC .......... *C09C 1/0015* (2013.01); *C09C 1/0033* (2013.01); *C09C 1/0078* (2013.01); *C09C 1/62* (2013.01); *C09D 7/40* (2018.01); *C09D 7/61* (2018.01); *C09D 7/68* (2018.01); *C09D 7/70* (2018.01); *C09D 201/00* (2013.01); *C01P 2004/61* (2013.01); *C08K 9/02* (2013.01); *C08K 2201/003* (2013.01); *C09C 2200/1008* (2013.01); *C09C 2200/302* (2013.01); *C09C 2200/303* (2013.01); *C09C 2200/304* (2013.01); *C09C 2200/306* (2013.01); *C09C 2210/10* (2013.01); *C09C 2220/20* (2013.01)

(58) Field of Classification Search
CPC ........... B32B 7/02; B32B 9/00; C09C 1/0015; C09C 1/0033; C09C 1/0006; C09C 1/0078; C09C 1/62; C09C 2200/1008; C09C 2200/302; C09C 2200/303; C09C 2200/304; C09C 2200/306; C09C 2210/10; C09C 2220/20; C01P 2004/61; C08K 9/02; C08K 2201/003

USPC ........................................................ 252/587
See application file for complete search history.

(56) References Cited

U.S. PATENT DOCUMENTS

| | | | |
|---|---|---|---|
| 6,569,529 B1* | 5/2003 | Phillips | ................. C09C 1/0015 106/403 |
| 2003/0215627 A1 | 11/2003 | Rosenberger et al. | |
| 2004/0071957 A1 | 4/2004 | Fujita | |
| 2010/0047291 A1 | 2/2010 | Hochstein et al. | |
| 2010/0203093 A1 | 8/2010 | Bujard et al. | |
| 2011/0237683 A1* | 9/2011 | Schmid | ................. C09C 1/0024 514/770 |
| 2017/0174893 A1 | 6/2017 | Fujita et al. | |

FOREIGN PATENT DOCUMENTS

| | | |
|---|---|---|
| EP | 1476300 B1 | 4/2011 |
| EP | 1476300 B1 | 4/2011 |
| EP | 3168266 A1 | 5/2017 |
| JP | H02-173060 | 7/1990 |
| JP | H05-078544 | 3/1993 |
| JP | H09-508172 A | 8/1997 |
| JP | H09508172 A | 8/1997 |
| JP | 2001-262016 A | 9/2001 |
| JP | 2002-020647 A | 1/2002 |
| JP | 2002-320912 | 11/2002 |
| JP | 2004-004840 A | 1/2004 |
| JP | 2004-162020 A | 6/2004 |
| JP | 2013-518953 A | 5/2013 |
| JP | 2013518953 A | 5/2013 |
| WO | WO1995/029140 A1 | 11/1995 |
| WO | WO2016/006664 A1 | 4/2017 |
| WO | WO2016006664 A1 | 4/2017 |

OTHER PUBLICATIONS

Chinese Office Action based on corresponding Application No. 201780006095.X; dated Nov. 21, 2019.
Office Action issued in corresponding IN application No. 201837025845 dated Aug. 24, 2020.

* cited by examiner

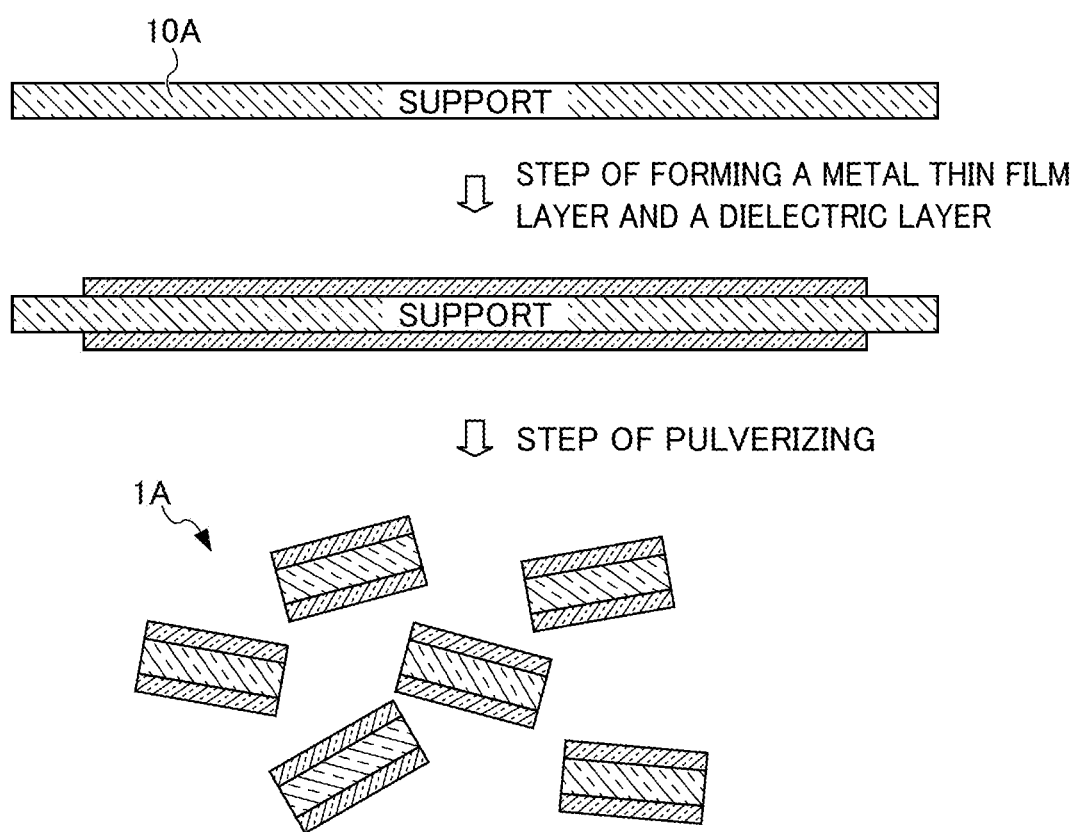

INFRARED REFLECTIVE COATING COMPOSITION

TECHNICAL FIELD

The present invention relates to an infrared-reflective coating composition.

BACKGROUND ART

In recent years, various thermal insulation coating materials have been proposed for forming thermal insulation coating films that reflect infrared light on surfaces of buildings and roads as one of the increasingly demanding energy-saving measures (for example, see Patent Documents 1 and 2). Coloring of these thermal insulation coating materials may be performed by a technique according to the subtractive color mixing method using a pigment with high infrared-light reflectance, such as titanium dioxide.

Meanwhile, a pigment having infrared-reflective capability may, in nature, generally reflect visible light as well. The selection of pigments in coloring may also be very limited. For example, a coloring pigment with less infrared-light absorption needs to be selected. Further, a dark color system such as black in particular may reduce infrared-light reflectance because of its low content ratio of titanium dioxide in a pigment. Therefore, the above technologies currently cannot be used for applications requiring sophisticated designs. In order to make it possible to apply to coating films having sophisticated designs, there have been demands for an infrared-reflective pigment having both high infrared-light reflectivity and high visible-light transmissivity.

As the infrared-reflective pigments such as described above, for example, as pigments which can reflect infrared light, but allow visible light to transmit, proposed are those including transparent electrically-conductive inorganic particulates such as ITO (tin-doped indium oxide) and ATO (antimony-doped tin oxide) (For example, see Patent Document 3), those including nano-sized hexaboride particulates as a heat-ray insulation component (for example, see Patent Document 4), optical coherence pigments with multilayered films of oxides (for example, see Patent Document 5). Heat-ray insulation plates also have been proposed in which titanium dioxide, or inorganic particles such as mica coated with titanium dioxide, which have heat-ray reflective capability, are kneaded in a transparent resin (for example, see Patent Documents 6 and 7).

Patent Document 1: Japanese Unexamined Patent Application, Publication No. 2002-20647

Patent Document 2: Japanese Unexamined Patent Application, Publication No. 2002-320912

Patent Document 3: Japanese Unexamined Patent Application, Publication No. 2001-262016

Patent Document 4: Japanese Unexamined Patent Application, Publication No. 2004-162020

Patent Document 5: Japanese Unexamined Patent Application, Publication No. 2004-4840

Patent Document 6: Japanese Unexamined Patent Application, Publication No. H05-78544

Patent Document 7: Japanese Unexamined Patent Application, Publication No. H02-173060

DISCLOSURE OF THE INVENTION

Problems to be Solved by the Invention

However, the pigment of Patent Document 3 suffers from absorption of near-infrared light. The pigment of Patent Document 4 suffers from poor visible-light transmissivity although it has high infrared reflectance. The pigment of Patent Document 5 suffers from a narrow wavelength region of reflectable infrared light. Moreover, the heat-ray insulation plates of Patent Documents 6 and 7 suffer from low heat-ray reflectance of inorganic particles themselves as well as reflection of visible light on the interface between resin and titanium dioxide.

Therefore, a technology of a coating film containing an infrared-reflective pigment that has both high infrared-light reflectivity and high visible-light transmissivity is not yet disclosed at the present time. Furthermore, in addition to these, there was a problem that a coating film formed containing the infrared-reflective pigment has low transparency and does not provide preferable coating film appearance.

The present invention is made in view of the aforementioned circumstances. An object of the present invention is to provide an infrared-reflective coating composition capable of forming an infrared-reflective coating film having both high infrared-light reflectivity and high visible-light transmissivity, and high transparency.

Means for Solving the Problems

In order to achieve the above object, the present invention provides an infrared-reflective coating composition that includes: a scale-like infrared-reflective pigment; and a resin component, wherein the infrared-reflective pigment includes a layered body that has dielectric layers and a metal thin film layer layered in an alternate fashion with the dielectric layer on the outermost layer; the dielectric layer is formed from one or more materials selected from the group consisting of titanium dioxide, niobium pentoxide, cerium oxide, tin-doped indium oxide, zinc oxide and tin oxide; the metal thin film layer is formed from a silver compound; a film thickness of the metal thin film layer is 5 to 15 nm; a film thickness of the dielectric layer is $((N\lambda)/(4r))\pm 20$ nm ($N=1$, 2 or 3) wherein wavelength $\lambda$ of incident light in and around a visible light region is 250 to 980 nm, and $r$ is a refractive index of the dielectric layer; and a proportion of the infrared-reflective pigment having a particle diameter of 1 μm or smaller in respect to the total infrared-reflective pigment is 10% by volume or smaller.

The layered body preferably has three layers or five layers.

Effects of the Invention

The present invention can provide an infrared-reflective coating composition that can form an infrared-reflective coating film that has both high infrared-light reflectivity and high visible-light transmissivity as well as having high transparency.

BRIEF DESCRIPTION OF THE DRAWINGS

FIG. 3 shows a second method of manufacturing an infrared-reflective pigment according to the present embodiment.

PREFERRED MODE FOR CARRYING OUT THE INVENTION

Embodiments of the present invention will be described below. Note that the present invention is not limited to the following embodiments.

The infrared-reflective coating composition according to the present embodiment is used for forming a coating film on matter to be coated such as glass, metal, plastics, wood, and cement substrates. Specific examples of matter to be coated include window glass, automobiles, roofs and outer walls of buildings.

The infrared-reflective coating composition according to the present embodiment contains a scale-like infrared-reflective pigment and a resin component. Furthermore, other than these, a solvent or the like can be contained as a main component.

The infrared-reflective pigment is a scale-like pigment that has both high infrared-light reflectivity and high visible-light transmissivity. The infrared-reflective pigment according to the present embodiment includes a layered body that includes dielectric layers and a metal thin film layer layered in an alternate fashion with the dielectric layer on the outermost layer.

In what follows, an infrared-reflective pigment according to one embodiment of the present invention will be described in detail with reference to the drawings.

Figure 1:
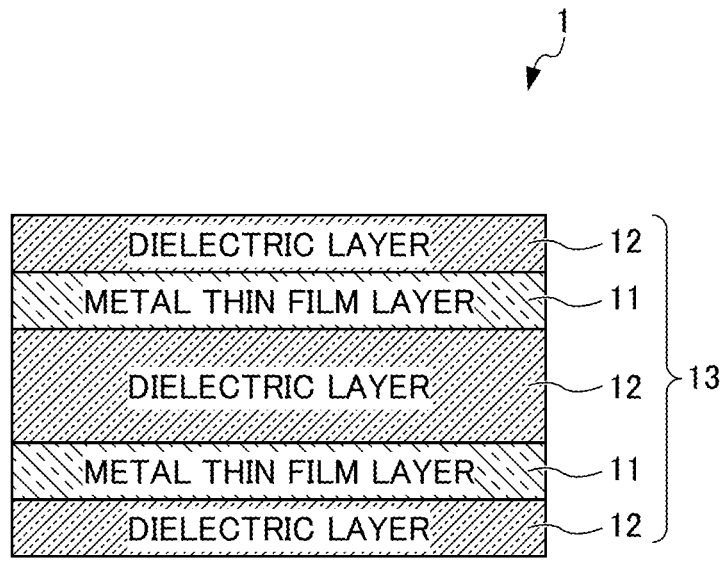
FIG. 1 schematically shows a cross-sectional structure of an infrared-reflective pigment according to one embodiment of the present invention.

FIG. 1 schematically shows a cross-sectional structure of an infrared-reflective pigment according to the present embodiment. As shown in FIG. 1, an infrared-reflective pigment 1 as one example of an infrared-reflective pigment according to the present embodiment includes a layered body 13 having total five layers of two metal thin film layers 11 and three transparent dielectric layers 12, which are layered in an alternate fashion with the dielectric layer 12 on the outermost layer. Note that the layered body 13 of the infrared-reflective pigment 1 according to the present embodiment is not limited to the five-layered structure as shown in FIG. 1. It will suffice as long as the metal thin layer 11 and the dielectric layers 12 are layered in an alternate fashion and the dielectric layer 12 is arranged on the outermost layer. The number of the layers is not limited, but a layered body having three layers or five layers is preferable. In such a case, when the metal thin film layer 11 or the dielectric layer 12 each is formed from different materials into continuous layers, the metal thin film layer 11 or the dielectric layer 12 each is counted as one layer.

In what follows, the structure of each layer of the metal thin film layer 11 and the dielectric layer 12 will be described in detail.

The metal thin film layer 11 has a function to reflect infrared light. The infrared-reflective pigment 1 according to the present embodiment is configured to include the layered body 13 having the metal thin film layer 11, and thus can show high infrared-light reflectivity.

The metal thin film layer 11 is formed from a silver compound. The silver compound in the present specification indicates a compound that contains silver as a main component, that is, a compound that contains 50% silver by mass or more. As the silver compound, for example, silver, Au—Ag alloys, Ag—In alloys, Ag—Sn alloys, Ag—Bi alloys, and Ag—Ga alloys can be used. When the metal thin film layer 11 is formed from the silver compound, an infrared-reflective pigment 1 having high infrared-light reflectivity can be obtained. The metal thin film layer 11 may be formed from a single silver compound or may be formed from a plurality of silver compounds. Note that when a plurality of layers of the metal thin film layers 11 are provided, each of the metal thin film layers 11 is preferably formed from the same kind of silver compound in view of manufacture. However, the metal thin film layers 11 may be each formed from different kinds of silver compounds.

The metal thin film layer 11 has a film thickness of 5 to 15 nm. When the film thickness of the metal thin film layer 11 is thinner than 5 nm, sufficient infrared-light reflectivity of the infrared-reflective coating film may not be obtained, and when the film thickness of the metal thin film layer 11 exceeds 15 nm, sufficient visible-light transmissivity may not be obtained. It is more preferable that the metal thin film layer 11 has a film thickness of 6 to 14 nm.

The dielectric layer 12 is transparent and functions as an antireflective layer of the metal thin film layer 11 in the visible light region. That is, the dielectric layer 12 has a function to improve the transmittance of an incident light in the visible light region. The infrared-reflective pigment 1 according to the present embodiment shows high visible-light transmissivity when configured by containing the layered body 13 having the dielectric layer 12.

The dielectric layer 12 is formed from one or more materials selected from the group consisting of titanium dioxide, niobium pentoxide, cerium oxide, tin-doped indium oxide, zinc oxide and tin oxide. Among these, titanium dioxide and tin-doped indium oxide (ITO) are preferably used. Note that from the viewpoint of production, each of the dielectric layers 12 is preferably formed from one material selected from the group consisting of titanium dioxide, niobium pentoxide, cerium oxide, tin-doped indium oxide, zinc oxide and tin oxide. However, each of the dielectric layers 12 may be formed from a mixture of different materials. Furthermore, the kind of the material that constitutes each of the dielectric layers 12 may be the same, or may be different from each other.

A film thickness of the dielectric layer 12 is $((N\lambda)/(4r)) \pm 20$ nm, when a wavelength $\lambda$ of incident light in and around the visible light region is 250 to 980 nm, and the refractive index of the dielectric layer 12 is r. Note that in the above equation, N is 1, 2 or 3. Furthermore, the visible light region in the present specification shows a region of a wavelength $\lambda$ of 380 to 780 nm. When the film thickness of the dielectric layer 12 is set as shown above, the visible-light transmittance of the dielectric layer 12 becomes excellent. Furthermore, the transmissivity of the visible light can be enhanced by making use of an optical interference effect. Note that a wavelength $\lambda$ of the incident light is preferably 250 to 780 nm, and more preferably 250 to 550 nm.

In the infrared-reflective pigment 1, a surface-treatment layer having an effect of suppressing deterioration in the infrared-reflective coating film may be coated on an entirety or a part of a surface of the layered body 13. Furthermore, a surface-tension adjustment layer that serves to promote migration of the infrared-reflective pigment 1 to a surface of a coating film may be coated on an entirety or a part of the surface of the surface-treatment layer, or the surface-tension adjustment layer may be contained in the surface-treatment layer.

Next, methods of manufacturing the infrared-reflective pigment 1 according to the present embodiment will be described.

[First Method of Manufacture]

Figure 2:
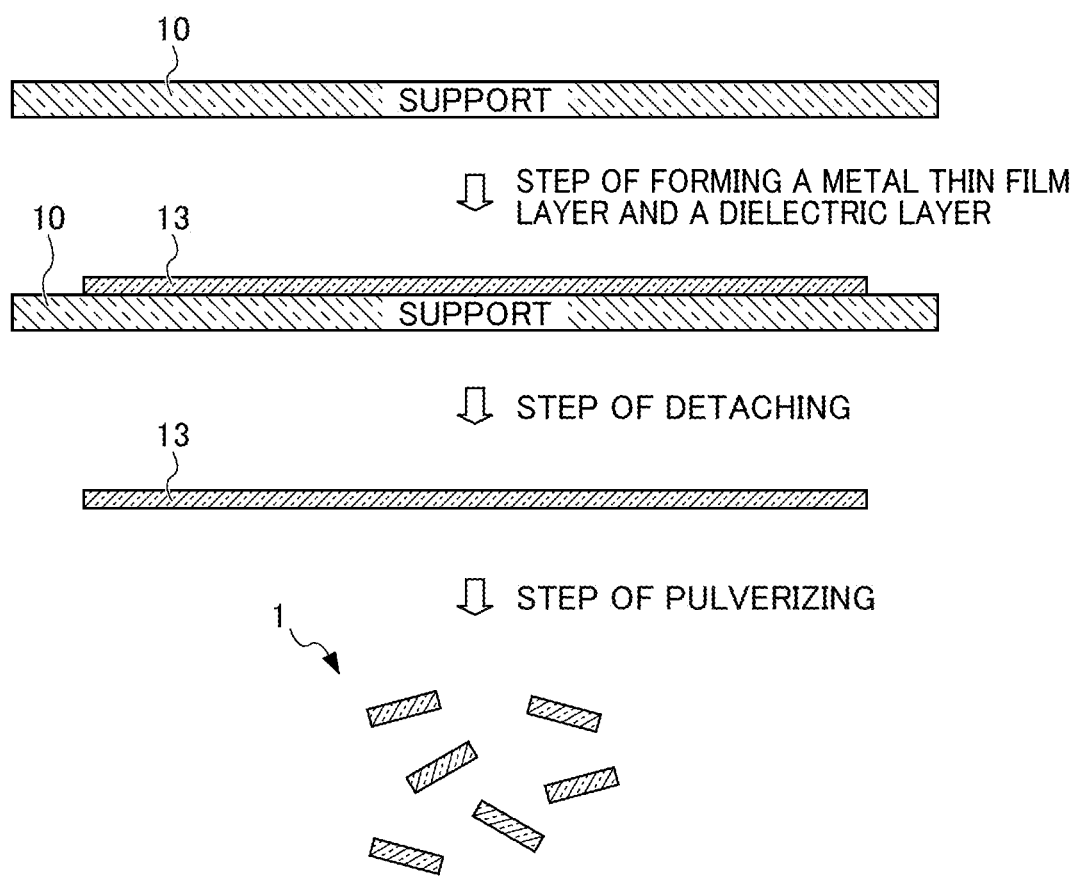
FIG. 2 shows a first method of manufacturing an infrared-reflective pigment according to the present embodiment.

FIG. 2 shows a first method of manufacturing the infrared-reflective pigment 1 according to the present embodiment. As shown in FIG. 2, the first method of manufacturing the infrared-reflective pigment 1 includes the steps of: forming the layered body 13 including the metal thin film layers 11 and the dielectric layers 12 on a support 10 (hereinafter, referred to as the step of forming a metal thin film layer and dielectric layer); detaching the layered body 13 from the support 10 (hereinafter, referred to as the step of detaching); and pulverizing the layered body 13 (hereinafter, referred to as the step of pulverizing).

First, in the step of forming a metal thin film layer and a dielectric layer, a metal thin film layer and a dielectric layer are layered on one surface (the upper surface in FIG. 2) of the support 10 in an alternate fashion to obtain the layered body 13. The support 10 can be transparent or opaque, and can be formed from a metal material, a polymer material, an oxide material, glass, or the like.

As the metal material, metal materials generally used for a support and the like can be used. Specific examples include various stainless steels (SUS) such as SUS 304, SUS 316, SUS 316L, SUS 420J2, and SUS 630; gold; platinum; silver; copper; nickel; cobalt; titanium; iron; aluminum; tin; or various alloys such as nickel-titanium (Ni—Ti) alloys, nickel-cobalt (Ni—Co) alloys, cobalt-chromium (Co—Cr) alloys, and zinc-tungsten (Zn—W) alloys; inorganic materials such as various ceramic materials; and even metal-ceramics complexes; and the like. These may be used alone independently, or may be used in combination of two or more.

As the polymer material, various resin films can be used. Specific examples thereof include polyolefin films (polyethylene, polypropylene, and the like), polyester films (polyethylene terephthalate, polyethylene naphthalate, and the like), polyvinyl chloride films, and cellulose triacetate films, and preferable examples include polyester films. Polyester films (hereinafter, polyesters) are preferably formed of a polyester having film formability and containing a dicarboxylic acid component and a diol component as the main constitutional components.

Among the aforementioned polyesters, terephthalic acid and 2,6-naphthalene dicarboxylic acid are preferred for the dicarboxylic acid component, and a polyester having a main constitutional component of ethylene glycol or 1,4-cyclohexane dimethanol as the diol component is preferred in view of transparency, mechanical strength, dimensional stability, and the like. Among these, preferred are a polyester having polyethylene terephthalate or polyethylene naphthalate as the main constitutional component; a copolymeric polyester composed of terephthalic acid, 2,6-naphthalene dicarboxylic acid, and ethylene glycol; and a polyester having a mixture of two or more of these polyesters as the main constitutional component.

As the oxide material, titanium dioxide, aluminum oxide, zirconium oxide, mica and the like are used.

A thickness of the support 10 is preferably 0.05 to 10 mm, and more preferably 0.1 to 5 mm. The support 10 may include two or more layered supports, and in this case, the types of each layered support in the support 10 may be the same, or may be different.

Note that a release layer formed with an acrylic ester copolymer resin as a raw material is preferably provided on a surface of the support 10. The release layer may be formed by a known method, and for example, it may be applied by a bar coater method, a dipping method, a spin coater method, a spray method or the like. When the release layer is provided on a surface of the support 10, the layered body 13 having the metal thin film layers 11 and the dielectric layers 12 can be easily detached from the support 10 in the step of detaching described below.

The metal thin film layer 11 and the dielectric layer 12 are each formed on the support 10 by a chemical vapor deposition method (CVD), a sputtering method, a solution coating method, an electron beam evaporation method (EB), an ion plating method, a dipping method, a spray method or the like. Among these, the chemical vapor deposition method (CVD), the electron beam evaporation method (EB), the sputtering method, and the solution coating method are preferably used.

The chemical vapor deposition method (CVD), the electron beam evaporation method (EB) and the sputtering method can form the layered body 13 having the metal thin film layer 11 and the dielectric layer 12 under publicly known conditions.

According to the solution coating method, a metal-containing solution including a component material of the metal thin film layer 11, and a dielectric substance-containing solution including a component material of the dielectric layer 12 are prepared, and these are then applied in an alternate fashion and dried to form a layered body 13 having the metal thin film layer 11 and the dielectric layers 12. Examples of the coating methods include a roll coating method, a rod bar coating method, an air knife coating method, a spray coating method, a slide-type curtain coating method, a slide hopper (slide bead) coating method, an extrusion coating method and the like. Coating amounts of the metal thin film solution and the dielectric substance solution are appropriately selected so that a film thickness after drying is within the preferred range of film thickness of each of the metal thin film layer 11 and dielectric layer 12.

Subsequently, in the step of detaching, the layered body 13 having the metal thin film layers 11 and the dielectric layers 12 is detached from the support 10. For example, the layered body 13 can be detached from the support 10 by immersing in a solvent as will be described below. As was described above, the layered body 13 formed on the support 10 can be easily detached by providing a release layer on a surface of the support 10.

Subsequently, in the step of pulverizing, the layered body 13 having the metal thin film layers 11 and the dielectric layers 12 which have been detached from the support 10 is pulverized into a desired size. As the pulverization method, for example, mechanical pulverization with a pulverizer, wet or dry pulverizations with a vibration mill, a ball mill, a jet mill, an ultrasonic cleaning machine, an ultrasonic disperser or the like may be used. When wet pulverization is used, any solvent may be used as long as a constitutional component of the layered body 13 does not dissolve therein. Examples of the solvent include: water; alcohols such as methanol, ethanol, isopropanol, n-butyl alcohol, t-butyl alcohol and ethylene glycol; ketones such as acetone, and methyl ethyl ketone; esters such as ethyl acetate; halides such as chloroform and methylene chloride; hydrocarbons such as butane and hexane; ethers such as tetrahydrofuran (THF), butyl ether, and dioxane; aromatics such as benzene, xylene, and toluene; amides such as N,N-dimethylformamide (DMF) and dimethylacetamide (DMAc); and solvent mixtures thereof. When dry pulverization is performed, the layered body 13 may be cooled with liquid nitrogen and the like to bring it to a hardened state, and then pulverized.

After the step of pulverizing, classification is preferably performed to obtain a desired particle diameter. For a method of classification, a conventionally known dry classifier or the like can be used. For example, used are a classifier with a mesh screen; a gravitational classifier of a horizontal flow-type, an upward flow-type, or the like in which coarse particles and fine powders are classified by taking advantage of the differences in the settling rates and the upward flow rates; a centrifugal classifier in which sedimentation of particles in a centrifugal field is used; an inertial classifier in which particles with large inertia are diverted from the flow line for classification by quickly changing the direction of a particle-carrying air flow.

In the infrared-reflective pigment 1 according to the present embodiment after the steps of pulverizing and classifying, a proportion of the infrared-reflective pigment 1 having a particle diameter of 1 μm or smaller is 10% by volume or smaller. In order to make the proportion of the infrared-reflective pigment 1 having the particle diameter of 1 μm or smaller to be 10% by volume or smaller, energy imparted in the step of pulverizing, specifically, when the mechanical pulverization is performed, a machine output or a pulverization time may be adjusted. Note that the pulverization method for making the particle diameter of the infrared-reflective pigment 1 to be the above value is not particularly limited, and any of the above pulverization methods can be used. The particle diameter and the volume % of the infrared-reflective pigment can be measured according to the methods described below.

(Measurement device) Laser Diffraction Particle Size Analyzer LS 13 320 (manufactured by Beckmann/Coulter Inc.)

(Measurement method) Wet method (solvent; IPA, Pump speed; 54%)

When the proportion of the infrared-reflective pigment 1 having the particle diameter of 1 μm or smaller is set to 10% by volume or smaller, since the haze value of the formed infrared-reflective coating film is reduced, and white blurring or turbidity of the formed infrared-reflective coating film is prevented, appearance thereof can be improved. Note that the proportion of the infrared-reflective pigment 1 having the particle diameter of 1 μm or smaller is preferably 5% by volume or smaller.

The infrared-reflective pigment 1 obtained may be subjected, after the step of pulverizing, as needs arise, to a step of forming a surface-treatment layer, and furthermore to a step of forming a surface-tension adjustment layer.

[Second Method of Manufacture]

FIG. 3 shows a second method of manufacturing the infrared-reflective pigment 1 according to the present embodiment. As shown in FIG. 3, the second method of manufacturing the infrared-reflective pigment 1 includes the steps of: forming a metal thin film layer and a dielectric layer on a support 10A to obtain a layered body 13 (hereinafter, referred to as the step of forming a metal thin film layer and a dielectric layer); and pulverizing the layered body 13 including the support 10A (hereinafter, referred to as the step of pulverizing). The second method of manufacture differs from the first method of manufacture in that the step of detaching is not included, and the support 10A constitutes a part of the infrared-reflective pigment 1.

As the support 10A, transparent materials may be used among those recited with regard to the first method of manufacture. Specifically, transparent materials made of titanium dioxide, aluminum oxide, zirconium oxide, mica, glass or the like may be used. Note that a release layer is not required on a surface of the support 10A because the step of detaching is not included.

The thickness of the support 10A is preferably 0.05 to 100 μm, and more preferably 0.1 to 50 μm from the viewpoint that the support 10A can serve as a substrate for formation of a thin film in the step of forming a metal thin film layer and a dielectric layer, and can be easily pulverized in the step of pulverizing.

Here, a dielectric thin plate 10*a* functioning as the dielectric layer 12 may be used as the support 10A. Specifically, titanium dioxide, niobium pentoxide, cerium oxide, tin-doped indium oxide, zinc oxide, and tin oxide which can constitute the dielectric layer 12 can be used as the dielectric layer thin plate 10*a*. The thickness of the dielectric thin plate 10*a* is to meet the aforementioned requirement for the thickness of the support 10A, and to be sufficient for functioning as the dielectric layer 12. Specifically, the film thickness of the dielectric thin plate 10*a* is $((N\lambda)/(4r))\pm20$ nm (N is 1, 2 or 3) when a wavelength λ of an incident light in and around the visible light region is 250 to 980 nm, and the refractive index of the dielectric layer 12 is r.

In the present embodiment, the metal thin film layer 11 and the dielectric layer 12 are formed on the both sides of the support 10A in the step of forming a metal thin film layer and a dielectric layer. The method of forming the metal thin film layer 11 and the dielectric layer 12 itself is similar to that in the first method of manufacture. For example, the dielectric layer 12 is formed after the metal thin film layer 11 is formed on the both sides of the support 10A. This provides a layered body 13 in which the dielectric layer 12 of the third layer at the middle of the five-layer structure is replaced by the support 10A in the layered body 13 shown in FIG. 1. Note that the metal thin film layers and the dielectric layers are formed on the both sides of the support 10A in the present embodiment, but they may be formed on only one side.

Subsequently, the resulting layered body 13 can be pulverized to obtain the infrared-reflective pigment 1A. The infrared-reflective pigment 1A may be subjected to the step of forming a surface-treatment layer after the step of pulverizing, and furthermore may be subjected to the step of forming a surface-tension adjustment layer. The step of pulverizing, the step of forming a surface-treatment layer, and the step of forming a surface-tension adjustment layer are similar to those in the first method of manufacture.

As the infrared-reflective pigment 1, those described above may be used. A content of the infrared-reflective pigment 1 in the infrared-reflective coating composition according to the present embodiment is preferably a content by which a surface density of the pigment is 60 to 300%. The surface density of the pigment (%) is a mass ratio (%) of the content of the infrared-reflective pigment actually contained relative to the content required to cover the entire coating surface in just the right amount such that the infrared-reflective pigment is aligned on one surface without mutually overlapping. Specifically, the surface density of the pigment may be calculated by the following formula.

$$\text{Surface density of pigment}(\%) = \text{WCA (cm}^2\text{/g)} \times \text{PWC}(\%) \times \text{specific gravity of coating film (g/cm}^3\text{)} \times \text{film thickness (cm)}$$

Here, WCA represents a water surface diffusion area per gram, and is calculated in accordance with a method based on JIS-K 5906:1998. Note that PWC may be calculated by the following formula.

$$\text{PWC}(\%) = \text{pigment}/(\text{solid content of resin+non-volatile component (of additives and the like)+pigment})$$

Examples of resin components include (a) acrylic resins, (b) polyester resins, (c) alkyd resins, (d) fluororesins, (e) epoxy resins, (f) polyurethane resins, (g) polyether resins and the like. They can be used alone or in combination of two or more. In particular, acrylic resins, polyester resins and alkyd resins are preferably used in view of weather resistance and economic efficiency.

Examples of the (a) acrylic resin include copolymers of an acrylic monomer and another ethylenically unsaturated monomer. Examples of acrylic monomers which can be used for the copolymer include: esterified substances of acrylic acid or methacrylic acid with methyl, ethyl, propyl, n-butyl, i-butyl, t-butyl, 2-ethylhexyl, lauryl, phenyl, benzyl, 2-hydroxyethyl, 2-hydroxypropyl, and the like; ring-opening addition products of caprolactone with acrylic acid or 2-hydroxyethyl methacrylate; glycidyl acrylate acid or glycidyl methacrylate, acrylamide, methacrylamide and N-methylolacrylamide, (meth)acrylic acid ester of polyhydric alcohol; and the like. Examples of ethylenically unsaturated monomers include styrene, α-methyl styrene, itaconic acid, maleic acid, vinyl acetate, and the like.

Examples of the (b) polyester resin include saturated polyester resins and unsaturated polyester resins, and specifically, condensates obtained by heating and condensing, for example, polybasic acid and polyhydric alcohol. Examples of the polybasic acid include saturated polybasic acids and unsaturated polybasic acids. Examples of the saturated polybasic acid include phthalic anhydride, terephthalic acid, succinic acid, and the like. Examples of the unsaturated polybasic acid include maleic acid, maleic anhydride, fumaric acid, and the like. Examples of the polyhydric alcohol include dihydric alcohols, trihydric alcohols and the like. Examples of the dihydric alcohol include ethylene glycol, diethylene glycol and the like. Examples of the trihydric alcohol include glycerin, trimethylolpropane, and the like.

Examples of the (c) alkyd resin include alkyd resins obtained by reacting the above polybasic acid, polyhydric alcohol and property modification material such as fats and fatty acids (soybean oil, linseed oil, coconut oil, stearic acid, and the like), and natural resin (rosin, amber, and the like).

Examples of the (d) fluororesin include either of vinylidene fluoride resin and tetrafluoroethylene resin or a mixture thereof, resins including various fluorine based copolymers which can be obtained by copolymerizing fluoroolefin and polymerizable compounds containing a hydroxy group and other polymerizable vinyl based compounds.

Examples of the (e) epoxy resin include resins which are obtained by reacting bisphenol with epichlorohydrin, and the like. Examples of the bisphenol include bisphenols A, F and the like. Examples of the bisphenol-type epoxy resins include Epicoat 828, Epicoat 1001, Epicoat 1004, Epicoat 1007, Epicoat 1009 and the like.

Examples of the (f) polyurethane resin include resins having urethane bonds which can be obtained from various polyol components such as acrylic, polyester, polyether, and polycarbonate, and polyisocyanate compounds. Examples of the above polyisocyanate compounds include 2,4-tolylene diisocyanate (2,4-TDI), 2,6-tolylene diisocyanate (2,6-TDI), and a mixture thereof (TDI), diphenylmethane-4,4'-diisocyanate (4,4'-MDI), diphenylmethane-2,4'-diisocyanate (2,4'-MDI), and a mixture thereof (MDI), naphthalene-1,5-diisocyanate (NDI), 3,3'-dimethyl-4,4'-biphenylene diisocyanate, xylylene diisocyanate (XDI), dicyclohexylmethane.diisocyanate (hydrogenated EDI), isophorone diisocyanate (IPDI), hexamethylene diisocyanate (EDI), hydrogenated xylylene diisocyanate (HXDI), and the like.

Examples of the (g) polyether resin include a polymer or copolymer with ether bonds and derived from a polyoxyethylene based polyether, a polyoxypropylene based polyether, or a polyoxybutylene based polyether, or an aromatic polyhydroxy compound such as bisphenol A or bisphenol F. Furthermore, examples include carboxy-group-containing polyether resins which are obtained by reacting the above polyether resin with a multivalent carboxylic acid such as succinic acid, adipic acid, sebacic acid, phthalic acid, isophthalic acid, terephthalic acid, or trimellitic acid and the like or with a reactive derivative such as acid anhydrides thereof.

The resin components described above are available in both the curing type and the lacquer type, any of which may be used. The curing type may be used in a mixture with a cross-linking agent such as an amino resin, a (block) polyisocyanate compound, an amine type, a polyamide type, or multivalent carboxylic acid, and a curing reaction can be promoted by heating or at ordinary temperature.

Furthermore, a resin component that is cured by UV rays may be used to cause a curing reaction by curing with UV rays. Examples of such a resin component include resin components constituted of a reactive monomer (that is, a UV monomer) or a reactive oligomer (that is, a UV oligomer). These monomers or oligomers are used as a mixture with a photopolymerization initiator and become resinous by curing (polymerizing) with UV rays. The curing reaction is largely divided into a radical polymerization type and a cationic polymerization type depending on reaction mechanism.

Examples of resin components of the radical polymerization type include urethane acrylate, acrylic resin acrylate (for example, ARONIX series produced by TOAGOSEI Co., Ltd.), epoxy acrylate, polyester acrylate, and silicone-modified acrylate. These can be used alone or in combination of two or more.

Examples of the photopolymerization initiators of the radical polymerization type that are used as a mixture with the resin component of the radical polymerization type include benzophenone, Michiler's ketone, o-benzoylmethyl benzoate, acetophenone, 2,4-diethyl thioxanthone, 2-chlorothioxanthone, ethyl anthraquinone, 1-hydroxycyclohexyl phenyl ketone (for example, IRGACURE 184 produced by BASF Japan), 2-hydroxy-2-methyl-1-phenyl-propan-1-one (for example, DAROCUR 1173 produced by BASF Japan), 2,2-dimethoxy-1,2-diphenylethan-1-one (for example, IRGACURE 651 produced by BASF Japan), 2-methyl-1-(4-methylthiophenyl)-2-morpholinopropan-1-one (for example, IRGACURE 907 produced by BASF Japan), 2-benzyl-2-dimethylamino-1(4-morpholinophenyl)-butanone-1 (for example, IRGACURE 369 produced by BASF Japan), 2,4,6-trimethylbenzoyl-diphenyl-phosphine oxide (for example, Lucirin TPO produced by BASF Japan), bis(2,4,6-trimethylbenzoyl)-phenyl phosphine oxide (for example, IRGACURE 819 produced by BASF Japan), and methyl benzoylformate.

Examples of the resin components of the cationic polymerization type include styrene derivatives, vinyl ether, oxirane, oxetane, tetrahydrofuran, lactam, and lactone compounds. These can be used alone or in combination of two or more.

Examples of the photopolymerization initiators of the cationic polymerization type that are used as a mixture with the resin component of the cationic polymerization type include chemically amplified photoresists and cationic polymerization initiators that are used for photo-cationic polymerizations (see "Imaging Organic Materials", edited by The Japanese Research Association for Organic Electronic Materials, published from Bunshin Publishing Company (1993), pages 187 to 192). Examples of suitable cationic polymerization initiators include $B(C_6F_5)_4^-$, $PF_6^-$, $AsF_6^-$, $SbF_6^-$, $CF_3SO_3$-salts of aromatic onium compounds such as diazonium, ammonium, iodonium, sulfonium, or phosphonium, sulfonated products that generate sulfonic acid, halides that photogenerate hydrogen halide, and Fe allene complex.

Note that as the polymer-type acrylate, any of the commercially available products and synthesized products may be used. When the synthesized product is used, one constituted of a photo-polymerizable monomer or a photo-polymerizable oligomer may be used. Known synthesis examples described in JP 2010-260905 A may be referenced.

Any of the above-described curing type resin components, lacquer type resin components, and UV-curing type resin components may be used alone or in combination of two or more.

A solvent can be appropriately selected in consideration of a coating method, a film-formation condition and the solubility to the support. Examples of the solvent include: water; alcohols such as methanol, ethanol, 2-propanol, and 1-butanol; esters such as ethyl acetate, butyl acetate, isobutyl acetate, ethyl propionate, ethylene glycol monomethyl ether acetate, propylene glycol monomethyl ether acetate, and propylene glycol monoethyl ether acetate; ethers such as diethyl ether, propylene glycol monomethyl ether, ethylene glycol monomethyl ether, ethylene glycol monoethyl ether, dioxane, and tetrahydrofuran (THF); glycol derivatives such as ethylene glycol, diethylene glycol, propylene glycol, dipropylene glycol, 1,3-butylene glycol, pentamethylene glycol, and 1,3-octylene glycol; amides such as formamide, N-methyl formamide, dimethyl formamide (DMF), dimethyl acetamide, dimethyl sulfoxide (DMSO), and N-methyl pyrrolidone (NMP); ketones such as acetone, methyl ethyl ketone (MEN), methyl propyl ketone, methyl isobutyl ketone, acetyl acetone and cyclohexanone; benzene derivatives such as toluene, xylene, mesitylene and dodecyl benzene; halogen-based solvents such as chloroform and dichloromethylene; and so on.

The infrared-reflective coating composition according to the present embodiment preferably has a solid content of coating (NV) of 1 to 90% by mass when it is coated. When the solid content of coating falls within the above range, the infrared-reflective pigment can be highly oriented as a coating film shrinks during the step of drying after coating, i.e., can be oriented parallel to a surface to be coated. This enables high infrared-light reflectivity and high visible-light transmissivity. The solid content of coating is more preferably 4 to 40% by mass.

Note that the infrared-reflective coating composition according to the present embodiment may contain, as components other than the above, an anti-sagging agent, a viscosity modifier, an antisettling agent, a cross-linking promoter, a curing agent, a leveling agent, a surface conditioner, a defoaming agent, a plasticizing agent, an antiseptic agent, an antifungal agent, an ultraviolet stabilizer, and the like. Furthermore, the infrared-reflective coating composition according to the present embodiment may contain, as needs arise, a slight amount of a coloring pigment, a brilliant pigment or a dye within a range that does not adversely affect the transparency. Specifically, the coloring pigment may be contained in a range of 20% by mass or less, and the brilliant pigment may be contained in a range of 5% by mass or less in the infrared-reflective coating composition.

As the coloring pigment, any of an organic type and an inorganic type can be used. Examples of the organic type coloring pigment include azo-chelate pigments, insoluble azo pigments, condensed azo pigments, diketopyrollopyrrole pigments, benzimidazolone pigments, phthalocyanine pigments, indigo pigments, perinone pigments, perylene pigments, dioxane pigments, quinacridone pigments, isoindolinone pigments, and metal complex pigments. Furthermore, examples of the inorganic coloring pigment include chrome yellow, yellow iron oxide, colcothar, carbon black, and titanium dioxide.

Examples of the brilliant pigment include what has been conventionally used in coating composition. Examples thereof include aluminum flake pigments, colored aluminum flake pigments, graphite pigments, mica pigments, metallic titanium flake pigments, stainless flake pigments, plate-like iron oxide pigments, phthalocyanine flake pigments and metal-plated glass flake pigments.

An infrared-reflective coating film can be obtained by coating the resulting infrared-reflective coating composition.

There is no limitation for the method of coating the infrared-reflective coating compound according to the present embodiment. For example, it may be coated with an applicator, a bar coater, a brush, a spray, or a roller. When the infrared-reflective coating compound according to the present embodiment is coated, the solid content of coating at the time of coating is preferably adjusted as described above so that the infrared-reflective pigment according to the present invention can be highly oriented as the infrared-reflective coating film shrinks.

The film thickness of the infrared-reflective coating film is preferably 0.5 to 100 μm, and more preferably 1 to 50 μm as a dry film. When the film thickness is thinner than 0.5 μm, roughness from the pigment appears on a coating film surface, and design properties are degraded. When the film thickness exceeds 100 μm, defects in the resulting coating film such as sagging and foaming tend to occur. The step of drying after coating the infrared-reflective coating composition is preferably performed at 5 to 200° C. and more preferably at 40 to 160° C., from the viewpoint of requirement of quick drying and curability.

The obtained infrared-reflective coating film is a coating film that has high infrared-light reflectivity and high visible-light transmissivity in combination, and has high transparency.

The infrared-light reflectivity of the infrared-reflective coating film is evaluated by the infrared reflectance and an evaluation standard thereof is 20% or higher. That is, the infrared reflectance is preferably 25% or higher, and more preferably 30% or higher. Note that the infrared reflectance in the present specification indicates the reflectance of infrared light in the wavelength range of 780 to 2500 nm.

The visible-light transmittance of the infrared-reflective coating film has an evaluation standard of 70% or higher, which is specified in the safety standards of automobile windshields. That is, the visible-light transmittance is preferably 70% or higher, and more preferably 80% or higher. The infrared reflectance and the visible-light transmittance can be measured according to a method in accordance with JIS-K5602:2008 "Determination of reflectance of solar radiation by paint film".

The transparency of the infrared-reflective coating film is evaluated by a haze value (fogging value) and has an evaluation standard of smaller than 3. That is, the haze value is preferably 2 or smaller and more preferably 1 or smaller. The haze value is calculated according to the following equation as a ratio of the diffusion transmittance ($T_d$(%)) to the total light transmittance ($T_t$ (%)) of the coating film.

$$\text{Haze value}(\%) = (T_d/T_t) \times 100$$

A clear coating film may be formed on the infrared-reflective coating film according to the present embodiment (In the present specification, when "infrared-reflective coating film" is used, this includes one on which the clear coating film is formed). The clear coating film is a transparent coating film that does not hide a primer layer and transmits visible light and infrared light, and, when irregularity on a surface of the coating film is smoothened, luster is imparted to the multi-layered coating film, thus improving appearance. A clear coating composition that forms the clear coating film is not particularly limited and can have any form such as a solvent type, an aqueous type, a powder type, or the like. As the solvent type coating composition or aqueous type coating composition, the composition may be one-liquid type or a two-liquid type such as a two-liquid type urethane resin coating composition. A clear coating composition used regularly as a top coating composition can be used as such a clear coating composition. For example, the product of mixing a curable film formation resin used in the base coating compositions mentioned above with a cross-linking agent can be used as a vehicle. Furthermore, the clear coating composition, as needs arise, may contain additives such as a coloring pigment, a body pigment, a modifier, a UV-absorber, a leveling agent, a dispersant, or a defoaming agent, within a range that does not adversely affect the transparency.

Note that the present invention is not limited to the above embodiments and may include modifications, improvements and so on within a scope that the object of the present invention can be achieved.

EXAMPLES

In what follows, the present invention will bP described in more detail with reference to Examples. However, the present invention is not limited by these Examples.

Examples 1 to 40, Comparative Examples 1 to 5

Infrared-reflective coating compositions of Examples 1 to 40 and Comparative Examples 1 to 5 were prepared according to the conditions shown in Tables 1 and 2. Specifically, the following procedures were performed for preparation.

TABLE 1

| | | Infrared-reflective pigment | | | | | | | | | |
|---|---|---|---|---|---|---|---|---|---|---|---|
| | | Dielectric layer | | Metal thin film layer | | | | | | Resin component | |
| | | Material type | Film thickness of outermost layer (nm) | Film thickness of inner layer (nm) | Material type | Film thickness (nm) | Total number of layers | Particle diameter of 1 μm or smaller (% by volume) | Design wavelength λ (nm) | Refractive index of dielectric layer | Main resin | Curing agent |
| Example | 1 | ITO | 45 | — | Ag | 10 | 3 | 1.5 | 350 | 1.95 | RA1 | — |
| | 2 | ZnO | 44 | — | Ag | 10 | 3 | 1.9 | 350 | 2 | RA1 | — |
| | 3 | SnO | 46 | — | Ag | 10 | 3 | 1.5 | 350 | 2 | RA1 | — |
| | 4 | $TiO_2$ | 36 | — | Ag | 13 | 3 | 1.5 | 350 | 2.4 | RA1 | — |
| | 5 | $TiO_2$ | 36 | — | Ag | 6 | 3 | 1.9 | 350 | 2.4 | RA1 | — |
| | 6 | $TiO_2$ | 36 | 72 | Ag | 10 | 5 | 1.2 | 350 | 2.4 | RA1 | — |
| | 7 | $Nb_2O_5$ | 38 | — | Ag | 12 | 3 | 1.6 | 350 | 2.3 | RA1 | — |
| | 8 | $Nb_2O_5$ | 38 | — | Ag | 6 | 3 | 1.3 | 350 | 2.3 | RA1 | — |
| | 9 | $Nb_2O_5$ | 38 | 76 | Ag | 10 | 5 | 1.7 | 350 | 2.3 | RA1 | — |
| | 10 | $CeO_2$ | 40 | — | Ag | 11 | 3 | 1.5 | 350 | 2.2 | RA1 | — |
| | 11 | $CeO_2$ | 40 | — | Ag | 6 | 3 | 1.9 | 350 | 2.2 | RA1 | — |
| | 12 | $CeO_2$ | 40 | 80 | Ag | 10 | 5 | 1.1 | 350 | 2.2 | RA1 | — |
| | 13 | ITO | 45 | — | Ag | 6 | 3 | 1.6 | 350 | 1.95 | RA1 | — |
| | 14 | ITO | 45 | — | Ag | 13 | 3 | 1.5 | 350 | 1.95 | RA1 | — |
| | 15 | ITO | 45 | — | Ag | 10 | 3 | 3.6 | 350 | 1.95 | RA1 | — |
| | 16 | ITO | 45 | — | Ag | 10 | 3 | 7.8 | 350 | 1.95 | RA1 | — |
| | 17 | ITO | 78 | — | Ag | 10 | 3 | 1.4 | 600 | 1.95 | RA1 | — |
| | 18 | ITO | 125 | — | Ag | 10 | 3 | 1.4 | 900 | 1.95 | RA1 | — |
| | 19 | ITO | 45 | 90 | Ag | 10 | 5 | 1.4 | 350 | 1.95 | RA1 | — |
| | 20 | ITO | 45 | 90 | Ag | 13 | 5 | 7.8 | 350 | 1.95 | RA1 | — |
| | 21 | ITO | 45 | — | Ag | 10 | 3 | 1.5 | 350 | 1.95 | RB1 | — |
| | 22 | ITO | 45 | — | Ag | 10 | 3 | 1.4 | 350 | 1.95 | RB2 | — |
| | 23 | ITO | 45 | — | Ag | 10 | 3 | 1.5 | 350 | 1.95 | RB3 | — |

TABLE 2

| | | Infrared-reflective pigment | | | | | | | | | |
|---|---|---|---|---|---|---|---|---|---|---|---|
| | | Dielectric layer | | Metal thin film layer | | | | | | Resin component | |
| | | Film thickness of outermost | Film thickness of inner | | Film | Total number | Particle diameter of 1 µm | Design | Refractive index of | | |
| | Material type | layer (nm) | layer (nm) | Material type | thickness (nm) | of layers | or smaller (% by volume) | wavelength λ (nm) | dielectric layer | Main resin | Curing agent |
| Example 24 | ITO | 45 | — | Ag | 10 | 3 | 1.5 | 350 | 1.95 | RB3 | — |
| 25 | ITO | 45 | — | Ag | 10 | 3 | 1.5 | 350 | 1.95 | RB4 | — |
| 26 | ITO | 45 | — | Ag | 10 | 3 | 1.7 | 350 | 1.95 | RB5 | — |
| 27 | ITO | 45 | — | Ag | 10 | 3 | 1.5 | 350 | 1.95 | RA1 | — |
| 28 | ITO | 45 | — | Ag | 10 | 3 | 1.5 | 350 | 1.95 | RA1 | — |
| 29 | ITO | 45 | — | Ag | 10 | 3 | 1.6 | 350 | 1.95 | RB6 | — |
| 30 | ITO | 45 | — | Ag | 10 | 3 | 1.7 | 350 | 1.95 | RB7 | RC1 |
| 31 | ITO | 45 | — | Ag | 10 | 3 | 1.6 | 350 | 1.95 | RB8 | RC2 |
| 32 | ITO | 45 | — | Ag | 10 | 3 | 1.6 | 350 | 1.95 | RB8 | RC2 |
| 33 | ITO | 45 | — | Ag | 10 | 3 | 1.7 | 350 | 1.95 | RB9 | RC3 |
| 34 | ITO | 45 | — | Ag | 10 | 3 | 1.7 | 350 | 1.95 | RB8 | RC2 |
| 35 | ITO | 45 | — | Ag | 10 | 3 | 1.7 | 350 | 1.95 | RB10 | RC4 |
| 36 | ITO | 45 | — | Ag | 10 | 3 | 1.7 | 350 | 1.95 | RD1 | — |
| 37 | ITO | 45 | — | Ag | 10 | 3 | 1.7 | 350 | 1.95 | RD2 | — |
| 38 | ITO | 45 | — | Ag | 10 | 3 | 1.7 | 350 | 1.95 | RD3 | — |
| 39 | ITO | 45 | — | Ag | 10 | 3 | 1.7 | 350 | 1.95 | RD4 | — |
| 40 | ITO | 45 | — | Ag | 10 | 3 | 1.7 | 350 | 1.95 | RD5 | — |
| Comparative Example 1 | $Cr_2O_3$ | 32 | 65 | Ag | 13 | 5 | 7.8 | 350 | 2.2 | RA1 | — |
| 2 | ZnS | 34 | 63 | Ag | 13 | 5 | 7.8 | 350 | 2.2 | RA1 | — |
| 3 | ITO | 45 | — | Ag | 4 | 3 | 1.3 | 350 | 1.95 | RA1 | — |
| 4 | ITO | 45 | — | Ag | 17 | 3 | 1.9 | 350 | 1.95 | RA1 | — |
| 5 | ITO | 45 | — | Ag | 10 | 3 | 12.5 | 350 | 1.95 | RA1 | — |

[Preparation of Infrared-Reflective Pigment]

Infrared-reflective pigments according to examples and comparative examples were prepared according to the following procedure. First, a solution was prepared by dissolving an acrylic resin ("Acrydic A-1371" manufactured by DIC Corporation) in butyl acetate so as to be 10% by mass (in terms of solid content), and coated on a 50×50×2 mm glass plate (manufactured by TP Giken Co., Ltd.) as a support 10 with a spin coater such that the dry film thickness was 1 µm. After that, the result was dried for 15 minutes at 80° C. to form a release layer.

Then, on the release layer, dielectric layers and metal thin film layers shown in Table 1 and 2 were formed in an alternate fashion up to a maximum of five layers with the dielectric layer on the outermost layer, thus forming a layered body 13. The dielectric layer and metal thin film layer were formed according to an electron beam method using a vacuum vapor deposition device (model number: EX-200) manufactured by ULVAC, Inc. With the design wavelength λ of incident light set to 350 nm in Examples 1 to 16, Examples 19 to 40, and Comparative Examples 1 to 5, similarly to 600 nm in Example 17, and similarly to 900 nm in Example 18, the dielectric layers were formed to have the film thicknesses shown in Tables 1 and 2. Each of the outermost layers was set to the same film thickness. Furthermore, even when there were a plurality of layers of the metal thin film layer, the film thicknesses thereof were each set to the same film thickness. Note that film thickness was controlled with a crystal oscillator type film thickness controller ("CRTM-6000G" manufactured by ULVAC Inc.). Furthermore, regarding the material species used in the dielectric layers and metal thin film layers in Tables 1 and 2, ITO indicates tin-doped indium oxide, ZnO indicates zinc oxide, SnO indicates tin oxide, $TiO_2$ indicates titanium dioxide, $Nb_2O_5$ indicates niobium pentoxide, $CeO_2$ indicates cerium oxide, $Cr_2O_3$ indicates chromium oxide, ZnS indicates zinc sulfide, and Ag indicates a silver compound.

Then, the layered body 13 was soaked in acetone for 30 minutes to dissolve and detach the release layer, and subjected to ultrasonic pulverization. Note that in Example 15 and Comparative Example 5, an agate mortar was used to pulverize, and in Example 16, an ultrasonic disperser was used to pulverize. Thereafter, after a nylon mesh having an opening of 50 µm was used to filtrate, washing with acetone and filtration with the nylon mesh were performed, thus obtaining infrared-reflective pigments. Note that the device output, the pulverization time or the like were adjusted such that the proportions (volume %) of particles of the infrared-reflective pigment having a particle diameter of 1 µm or smaller were the values shown in Tables 1 and 2.

[Synthesis of Main Resin]

As main resins RA1, RB1 to RB10, and RD1 to RD5 shown in Tables 1 and 2, products synthesized as shown below or commercially availed products were used.

The main resin RA1 was synthesized as shown below. In a 2 liter reaction container equipped with a stirrer, a thermostat, and a cooling pipe, 500 parts by mass of methoxy propanol was charged, into which a monomer solution formed from 15 parts by mass of acrylic acid, 180 parts by mass of styrene, 10 parts by mass of n-butyl acrylate and 390 parts by mass of n-butyl methacrylate and an initiation agent solution formed from 60 parts by mass of methoxy propanol and 12 parts by mass of t-amyl peroxyoctoate were dropped at 115° C. for 3 hours, followed by continuous stirring for 1 hour further. Then, an initiator solution formed from 10 parts by mass of methoxy propanol and 2 parts by mass of t-amyl peroxyoctoate was dropped at 115° C. for 30 minutes, followed by continuing stirring for 30 minutes further, whereby an acryl varnish having Gardner bubble viscosity of S, a solid content acid value of 20 mg KOH/g and a solid content of 50% by mass was obtained. A number average molecular weight of the acrylic resin was measured with "HLC 8220 GPC" (product name, manufactured by TOSO Corporation) as a GPC device, two of "Shodex KF-606M" and "Shodex KF-603" (both manufactured by Showa Denko Co., Ltd., product names) as columns, and under the conditions of mobile phase: tetrahydrofuran, measurement temperature: 40° C., flow rate: 0.6 cc/minute, and detector: RI, and the number average molecular weight was found to be 14,000.

As the main resin RB1, commercially available Praxel L320AL (manufactured by Daicel Corporation) which is a polyester resin having a molecular weight of about 2,000 was used.

As the main resin RB2, commercially available S-LEC BL-1 (manufactured by Sekisui Chemical Co., Ltd.) which is a butyral resin having a calculated molecular weight of about 19,000 and a butyralization degree of about 63 was used.

As the main resin RB3, commercially available Sokalan VA64P (manufactured by BASF Japan) which is a 60/40 copolymer between vinyl pyrrolidone and vinyl acetate was used. Note that the main resin RB3 can be used as an aqueous resin solution.

As the main resin RB4, commercially available Kuraray Poval PVA217EE (manufactured by Kuraray Co., Ltd.) which is polyvinyl alcohol having a saponification degree of about 88 mol % and a molecular weight of about 75,000 was used. Note that the main resin RB4 can be used as an aqueous resin solution.

As the main resin RB5, commercially available SN THICKENER N-1 (manufactured by SAN NOPCO) which is an aqueous solution of polycarboxylic acid resin having pH of about 1.8, viscosity of about 15,000 mPa·s, and a resin solid content of about 25% by mass was used.

The main resin RB6 was synthesized as shown below. A monomer mixture made of 35 parts by mass of methyl methacrylate, 20 parts by mass of ethyl acrylate, 35 parts by mass of n-butyl acrylate, 9 parts by mass of styrene and 1 part by mass of methacrylic acid was added to a solution obtained by mixing 60 parts by mass of ion exchange water with 6 parts by mass of Aqualon HS-10 (anionic reactive emulsifier manufactured by Daiichi Kogyo Seiyaku Co., Ltd.), followed by emulsifying with a stirrer, thus obtaining a pre-emulsion of the monomer mixture. Furthermore, an initiator aqueous solution was obtained by dissolving 0.3 part by mass of ammonium persulfate in 17 parts by mass of ion exchange water. In a reaction container equipped with a dropping funnel, a thermometer, a nitrogen introduction pipe, a reflux condenser and a stirrer, in 70 parts by mass of ion exchange water, 2 parts by mass of Aqualon HS-10 was charged, followed by heating to 80° C. under nitrogen atmosphere. Then, the obtained pre-emulsion and the initiator aqueous solution were simultaneously dropped from separate dropping funnels for 3 hours. After the end of dropping, the reaction was continued for another two hours at the same temperature. After cooling, an aqueous solution of a basic neutralization agent made of 7 parts by mass of ion exchange water and 1 part y mass of dimethyl ethanol amine was used to neutralize. The emulsion resin obtained in this manner had a solid content of 40% by mass and an average particle diameter of 90 nm.

The main resin RB7 was synthesized as shown below. A monomer mixture made of 10 parts by mass of diacetone acrylamide, 30 parts by mass of methyl methacrylate, 20 parts by mass of ethyl acrylate, 30 parts by mass of n-butyl acrylate, 9 parts by mass of styrene and 1 part by mass of methacrylic acid was added to a solution obtained by mixing 60 parts by mass of ion exchange water with 6 parts by mass of Aqualon HS-10 (anionic reactive emulsifier manufactured by Daiichi Kogyo Seiyaku Co., Ltd.), followed by emulsifying with a stirrer, thus obtaining a pre-emulsion of the monomer mixture. Furthermore, an initiator aqueous solution was obtained by dissolving 0.3 parts by mass of ammonium persulfate in 17 parts by mass of ion exchange water. In a reaction container equipped with a dropping funnel, a thermometer, a nitrogen introduction pipe, a reflux condenser and a stirrer, in 70 parts by mass of ion exchange water, 2 parts by mass of Aqualon HS-10 was charged, followed by heating to 80° C. under nitrogen atmosphere. Then, the obtained pre-emulsion and initiator aqueous solution were dropped simultaneously from separate dropping funnels for 3 hours. After the end of dropping, the reaction was continued for another two hours at the same temperature. After cooling, an aqueous solution of a basic neutralization agent made of 7 parts by mass of ion exchange water and 1 part by mass of dimethyl ethanol amine was used to neutralize. The emulsion resin obtained in this manner had a solid content of 40% by mass and an average particle diameter of 90 nm.

The main resin RB8 was synthesized as shown below. Into a reaction container, 330 parts by mass of deionized water was added, followed by heating to 80° C. while stirring under the flow of nitrogen. Next, 3% by mass of a monomer emulsion made of 11.25 parts by mass of acrylic acid, 139 parts by mass of n-butyl acrylate, 75 parts by mass of methyl methacrylate, 187 parts by mass of n-butyl methacrylate, 75 parts by mass of 2-ethylhexyl methacrylate, 150 parts by mass of 2-hydroxyethyl methacrylate, 112 parts by mass of styrene, 11.2 parts by mass of Thiokalcol 20 (n-dodecyl mercaptan, manufactured by Kao Corporation, effective component: 100%), 74.3 parts by mass of LATEMUL PD-104 (emulsifier, manufactured by Kao Corporation, effective component: 20%), and 300 parts by mass of deionized water, and 30% by mass of an initiation agent solution formed from 2.63 parts by mass of ammonium persulfate and 90 parts by mass of deionized water were dropped for 15 minutes in parallel into the reaction container. After the end of the dropping, the solution was aged at the same temperature for 15 minutes. Furthermore, the remaining monomer emulsion and initiation agent solution were dropped for 180 minutes in parallel into the reaction container. After the end of the dropping, the solution was aged at the same temperature for 1 hour. Then, the solution was cooled to 40° C., followed by filtering with a 200 mesh filter, whereby an acrylic resin emulsion having an average particle diameter of 200 nm, a nonvolatile component of 49% by mass, a solid content acid value of 15 mg KOH/g, and a hydroxyl value of 85 mg KOH/g was obtained.

The main resin RB9 was synthesized as shown below. Into a 2 liter reactor equipped with a stirrer, a condenser and a heater, 75 parts by mass of methyl propylene glycol was charged, followed by heating to 120° C. After that, a monomer mixture made of 13.6 parts by mass of styrene, 23.3 parts by mass of n-butyl acrylate, 23.7 parts by mass of tert-butyl methacrylate, 18.6 parts by mass of 2-hydroxyethyl methacrylate, and 0.8 part by mass of ethylene glycol dimethacrylate and a solution in which 2.4 parts by mass of tert-butylperoxy-2-ethyl hexanoate was dissolved in 16 parts by mass of methyl propylene glycol were uniformly dropped for 90 minutes in two series. The reaction mixture was maintained at 120° C. for 60 minutes, then, a monomer mixture of 2.5 parts by mass of n-butyl methacrylate, 12.9 parts by mass of 4-hydroxybutyl acrylate, and 4.6 parts by mass of acrylic acid and a solution in which 0.6 part by mass of tert-butylperoxy-2-ethyl hexanoate was dissolved in 4 parts by mass of methyl propylene glycol were uniformly dropped for 60 minutes in two series. The reaction mixture was maintained at 120° C. for 30 minutes, and further, a solution in which 0.3 parts by mass of tert-butylperoxy-2-ethyl hexanoate was dissolved in 5 parts by mass of methyl propylene glycol was uniformly dropped for 30 minutes in one series. After further stirring at 120° C. for 60 minutes, the mixture was cooled to 70° C., and thus acryl polyol was synthesized. The resin solid content of the obtained acryl polyol was 49.8% by mass and the number average molecular weight thereof was 6,300. Subsequently, methyl propylene glycol was distilled away under reduced pressure from the obtained resin solution until the solid content was 85% by mass, followed by adding 9 parts by mass of T-SOL 100 FLUID (manufactured by Tonen General Sekiyu K. K) to dilute. After adding 5.7 parts by mass of dimethyl ethanolamine to the diluted solution, 89.8 parts by mass of water was added to prepare an acryl polyol aqueous dispersion. The obtained aqueous dispersion had a resin solid content of 45.5% by mass, a volume average particle diameter of 160 nm as obtained by a laser scattering method, and a pH of 8.5.

The main resin RB10 was synthesized as shown below. Into a reaction container, 33 parts by mass of xylene and 7 parts by mass of dioxane were added, followed by heating to 100° C. while mixing and stirring under nitrogen flow. Then, a monomer mixture containing 25 parts by mass of n-butyl methacrylate, 23 parts by mass of n-butyl acrylate, 12 parts by mass of 2-hydroxyethyl methacrylate, and 40 parts by mass of isobornyl acrylate was prepared, and 100 parts by mass of the monomer mixture and an initiation agent solution made of 8 parts by mass of xylene, 2 parts by mass of dioxane and 1.8 parts by mass of tert-butylperoxy-2-ethyl hexanoate were dropped in parallel over 3 hours into the reaction container. After the end of the dropping, the solution was aged at the same temperature for 0.5 hour. Furthermore, an initiation agent solution made of 4.0 parts by mass of xylene, 1.0 part by mass of dioxane and 0.5 part by mass of tert-butylperoxy-2-ethyl hexanoate was dropped into the reaction container over 0.5 hour. After the end of the dropping, by aging the solution at the same temperature for 2 hours, a coating film generating resin having a nonvolatile content of 64% by mass, a number average molecular weight of 10,000, and a weight average molecular weight of 27,000 was obtained.

As the main resin RD1, commercially available ARONIX M-1200 (manufactured by TOAGOSEI Co., Ltd.) which is a radical-polymerized urethane acrylate was used.

As the main resin RD2, commercially available ARONIX M-305 (manufactured by TOAGOSEI Co., Ltd.) which is a radical polymerization type acrylic resin acrylate was used.

As the main resin RD3, commercially available ARONIX M-211B (manufactured by TOAGOSEI Co., Ltd.) which is a radical polymerization type epoxy acrylate was used.

As the main resin RD4, commercially available ARONIX M-8060 (manufactured by TOAGOSEI Co., Ltd.) which is a radical polymerization type polyester acrylate was used.

As the main resin RD5, commercially available ARONE OXETANE OXT-121 (manufactured by TOAGOSEI Co., Ltd.) which is a cationic polymerization type oxetane resin was used.

[Curing Agent]

Furthermore, the following were used as the curing agents RC1 to RC4 shown in Table 2.

RC1; Adipic acid dihydrazide (manufactured by Nippon Kasei Chemical Co., Ltd.)

RC2; Cymel 327/mixing alkyd melamine resin (manufactured by Mitsui Cytec, Ltd.)

RC3; Bayhydur XP2655/polyisocyanate group with sulfonic acid group (manufactured by SUMICA BAYER URETHANE Co., Ltd.)

RC4; Desmodur H/hexamethylene-1,6-diisocyanate (manufactured by SUMICA BAYER URETHANE Co., Ltd.)

A blending amount of the curing agent in each of resin components of Examples 30 to 35 is specifically as shown below. Example 30; RC1 was mixed such that hydrazide groups are 1:1 by mole number to carbonyl groups derived from diacetone acryl amide in the RB7. Examples 31, 32, 34; the main resin RB8 and RC2 were mixed such that the solid content ratio is 65:35. Example 33; RB9 and RC3 were mixed such that a molar ratio of hydroxyl groups of RB9 and isocyanate groups of RC3 is 1:1.1. Example 35; RB10 and RC4 were mixed such that a molar ratio of hydroxyl groups of RB10 and isocyanate groups of RC4 is 1:1.1.

Using the infrared-reflective pigments and resin components RA1, RB1 to RB10, RD1 to RD5, and RC1 to RC4, which were obtained as shown above, infrared-reflective coating compositions according to Examples and Comparative Examples were obtained. Note that a blending ratio in each of the infrared-reflective coating compositions is 3.5% by mass of the infrared-reflective pigment and 96.5% by mass of the resin component. As the solvent, methoxy propanol was used in Examples 1 to 20, 22, 23, and 26 to 29, and Comparative Examples 1 to 5; methyl ethyl ketone was used in Example 21; deionized water was used in Examples 24, 25, and 30; butyl cellosolve (ethylene glycol monobutyl ether) and deionized water (weight ratio=1:1) were used in Examples 31, 32 and 34; dipropylene glycol dimethyl ether and deionized water (weight ratio=1:9) were used in Example 33; T-SOL 100 FLUID (aromatic hydrocarbon, manufactured by Tonen General Sekiyu K. K) was used in Example 35; and butyl acetate was used in Examples 36 to 40. Note that in all of Examples 36 to 40, 90.2 parts by mass of the main resin and 0.1 part by mass of Tego Rad 2200N (polydimethyl siloxane modified with a polyether group having an acryloyl group in a side chain; manufactured by TEGO CHEMIE GmbH) were added, and, in addition to these, as the photopolymerization initiator, in Examples 36 to 39, 6.2 parts by mass of hydroxycyclohexyl phenyl ketone was further mixed, and in Example 40, 6.2 parts by mass of triaryl sulfonium tetrakis- (pentafluorophenyl) borate was mixed to use. As a method of dispersing the infrared-reflective pigment in the coating composition, a mix rotor MR-5 (manufactured by AS ONE Corporation) was used.

Next, each of the infrared-reflective coating compositions was coated on a glass plate. As the coating method, a bar coater was used in Examples 1 to 26, 29, 30, 33, and 35 to 40 and Comparative Examples 1 to 5. A brush coating method was used in Example 27. An air spray coating method was used in Examples 28, 31, 32 and 34. Furthermore, a coating amount or the like was adjusted such that each dry film thickness was 30 μm.

After coating each of the infrared-reflective coating compositions, the coated film was dried. The drying conditions were set to 60° C. for 30 minutes in Examples 1 to 28 and 35, and Comparative Examples 1 to 5, to about 20° C. for one day in Examples 29 and 30, to 140° C. for 30 minutes in Examples 31 and 34, to 80° C. for 5 minutes as the preheat in Example 32, and to about 30° C. for 4 hours in Example 33. In Examples 36 to 40, each of the coating films was charged in a hot air circulation furnace set at 80° C. for 1 minute to remove the solvent. Then, UV-rays were irradiated at 500 mJ/cm².

In Examples 28, 31, 32 and 34, on an upper layer of the infrared-reflective coating film, a clear coating composition was further coated. As the clear coating composition, in Example 28, the main resin RA1 was used, and in Examples 31, 32 and 34, a solvent type clear coating composition Mac flow O-1820 (manufactured by Nippon Paint Automotive Coatings Co., Ltd.) was coated using an air spray coater (but in Example 34, a bar coater was used to coat. Drying conditions were set to 140° C. for 30 minutes and a coating amount was adjusted such that the dry film thickness was 35 μm. Note that in Example 32, wet on wet coating was performed in which after the pre-heat (80° C. for 5 minutes), a clear coating composition was coated. In this way, each of the infrared-reflective coating films was obtained. The obtained infrared-reflective coating films were subjected to the following tests.

[Infrared Reflectance]

As evaluation of the infrared-light reflectivity, infrared-reflective coating films of each of Examples and Comparative Examples were subjected to measurement of infrared reflectance. Measurement was carried out in accordance with JIS-K5602:2008 "Determination of reflectance of solar radiation by paint film". The spectrophotometer used in the measurement was a spectrophotometer (model number: UV3600) manufactured by Shimadzu Corporation. Furthermore, evaluation criteria were set as shown below, and level 2 or higher in the following evaluation criteria was determined as acceptable. Results are shown in Table 3.
(Evaluation Criteria)
3: infrared reflectance is 30% or larger
2: infrared reflectance is 20% or larger and smaller than 30%
1: infrared reflectance is smaller than 20%

[Visible-Light Transmittance]

The visible-light transmittance of each of the infrared-reflective coating films of Examples and Comparative Examples was measured. The measurement was carried out in accordance with JIS-K5602:2008 "Determination of reflectance of solar radiation by paint film". The spectrophotometer used in the measurement was a spectrophotometer (model number: UV3600) manufactured by Shimadzu Corporation. Furthermore, evaluation criteria were set as shown below, and level 2 or higher in the following evaluation criteria was determined as acceptable. Results are shown in Table 3.
(Evaluation Criteria)
3: visible-light transmittance is 80% or higher
2: visible-light transmittance is 70% or higher and lower than 80%
1: visible-light transmittance is lower than 70%

[Haze]

The haze value of each of the infrared-reflective coating films of Examples and Comparative Examples was measured for an evaluation of coating film transparency. A haze meter (NDH2000 manufactured by Nippon Denshoku Industries Co., Ltd.) was used to measure the diffusion transmittance ($T_d$(%)) and the total light transmittance ($T_t$ (%)), and the haze value was calculated. Furthermore, evaluation criteria were set as shown below, and level 2 or higher in the following evaluation criteria was determined as acceptable. Results are shown in Table 3.
(Evaluation Criteria)
3: haze value is 1 or smaller
2: haze value is larger than 1 and smaller than 3
1: haze value is 3 or larger

TABLE 3

| | | Visible-light transmittance | Infrared reflectance | Haze |
|---|---|---|---|---|
| Example | 1 | 3 | 3 | 3 |
| | 2 | 3 | 2 | 3 |
| | 3 | 3 | 3 | 3 |
| | 4 | 3 | 3 | 3 |
| | 5 | 3 | 2 | 3 |
| | 6 | 3 | 3 | 3 |
| | 7 | 3 | 3 | 3 |
| | 8 | 3 | 2 | 3 |
| | 9 | 3 | 3 | 3 |
| | 10 | 3 | 3 | 3 |
| | 11 | 3 | 2 | 3 |
| | 12 | 3 | 3 | 3 |
| | 13 | 3 | 2 | 3 |
| | 14 | 2 | 3 | 3 |
| | 15 | 3 | 3 | 3 |
| | 16 | 2 | 3 | 2 |
| | 17 | 3 | 3 | 3 |
| | 18 | 3 | 3 | 3 |
| | 19 | 3 | 3 | 3 |
| | 20 | 2 | 3 | 2 |
| | 21 | 3 | 3 | 3 |
| | 22 | 3 | 3 | 3 |
| | 23 | 3 | 3 | 3 |
| | 24 | 3 | 3 | 3 |
| | 25 | 3 | 3 | 3 |
| | 26 | 3 | 3 | 3 |
| | 27 | 3 | 3 | 3 |
| | 28 | 3 | 3 | 3 |
| | 29 | 3 | 3 | 3 |
| | 30 | 3 | 3 | 3 |
| | 31 | 3 | 3 | 3 |
| | 32 | 3 | 3 | 3 |
| | 33 | 3 | 3 | 3 |
| | 34 | 3 | 3 | 3 |
| | 35 | 3 | 3 | 3 |
| | 36 | 3 | 3 | 3 |
| | 37 | 3 | 3 | 3 |
| | 38 | 3 | 3 | 3 |
| | 39 | 3 | 3 | 3 |
| | 40 | 3 | 3 | 3 |
| Comparative Example | 1 | 1 | — | — |
| | 2 | 1 | — | — |
| | 3 | 3 | 1 | — |
| | 4 | 1 | — | — |
| | 5 | 2 | 3 | 1 |

By comparing Examples 1 to 40 with Comparative Examples 1 and 2, it was found that the infrared-reflective coating films of Examples 1 to 40 have higher visible light transmissivity than the infrared-reflective coating films of Comparative Examples 1 and 2. From this, it was confirmed that when the infrared-reflective pigment in which the dielectric layer is formed from one or two or more kinds selected from the group consisting of titanium dioxide, niobium pentoxide, cerium oxide, tin-doped indium oxide, zinc oxide, and tin oxide is contained in the infrared-reflective coating composition, an infrared-reflective coating film having high visible-light transmissivity can be formed.

By comparing Example 13 with Comparative Example 3, it was found that the infrared-reflective coating film of Example 13 has a higher infrared reflectance than that of the infrared-reflective coating film of Comparative Example 3 From this, it was confirmed that when the infrared-reflective coating composition contains an infrared-reflective pigment with a film thickness in the metal thin film layer of 5 nm or thicker, an infrared-reflective coating film having high infrared-light reflectivity can be formed.

By comparing Example 14 with Comparative Example 4, it was found that the infrared-reflective coating film of Example 14 has a higher visible-light transmittance than that of the infrared-reflective coating film of Comparative Example 4. From this, it was confirmed that when the infrared-reflective coating composition contains an infrared-reflective pigment with a film thickness in the metal thin film layer of 15 nm or thinner, an infrared-reflective coating film having high visible transmissivity can be formed.

By comparing Examples 1 to 40 with Comparative Example 5, it was found that the infrared-reflective coating films of Examples 1 to 40 have lower haze values than that of the infrared-reflective coating film of Comparative Example 5. From this, it was confirmed that when the infrared-reflective coating composition contains 10% by volume or smaller of infrared-reflective pigment having particle diameter of 1 μm or smaller, an infrared-reflective coating film having high transparency can be formed.

EXPLANATION OF REFERENCE NUMERALS 1, 1A INFRARED-REFLECTIVE PIGMENT
10, 10A SUPPORT
11 METAL THIN FILM LAYER
12 DIELECTRIC LAYER
13 LAYERED BODY

The invention claimed is:

1. An infrared-reflective coating composition comprising:
a infrared-reflective pigment; and
a resin component;
wherein the infrared-reflective pigment consists a layered body consisting of one metal thin film layer and two transparent dielectric layers, or two metal thin film layers and three transparent dielectric layers, wherein the metal thin film layer or layers and the transparent dielectric layers are in an alternate fashion with the dielectric layer on the outermost layer;

the dielectric layer consists of one or more materials selected from the group consisting of titanium dioxide, niobium pentoxide, cerium oxide, tin-doped indium oxide, zinc oxide and tin oxide;

the metal thin film layer consists of a silver compound;

a film thickness of the metal thin film layer is 5 to 15 nm;

a film thickness of the dielectric layer is $((N\lambda)/(4r))\pm 20$ nm (N=1, 2 or 3), wherein wavelength $\lambda$ of incident light in and around a visible light region is 250 to 980 nm, and r is a refractive index of the dielectric layer; and a proportion of the infrared-reflective pigment having a particle diameter of 1 μm or smaller in respect to the total infrared-reflective pigment is 10% by volume or smaller; and a visible-light transmittance of an infrared-reflective coating film obtained by coating the infrared-reflective coating composition is 70% or higher.

* * * * *